(12) United States Patent
Sanz Martinez et al.

(10) Patent No.: US 10,697,396 B2
(45) Date of Patent: Jun. 30, 2020

(54) FAN COWL MOUNTED TO THRUST REVERSER

(71) Applicant: Rohr, Inc., Chula Vista, CA (US)

(72) Inventors: Pablo T. Sanz Martinez, San Diego, CA (US); Jihad Ramlaoui, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 322 days.

(21) Appl. No.: 15/785,770

(22) Filed: Oct. 17, 2017

(65) Prior Publication Data

US 2019/0113002 A1  Apr. 18, 2019

(51) Int. Cl.
   *F02K 1/72*  (2006.01)
   *F02K 1/80*  (2006.01)
   *F02K 1/64*  (2006.01)
   *B64D 29/06* (2006.01)

(52) U.S. Cl.
   CPC .............. *F02K 1/72* (2013.01); *B64D 29/06* (2013.01); *F02K 1/64* (2013.01); *F02K 1/80* (2013.01); *F05D 2220/323* (2013.01); *F05D 2240/129* (2013.01); *F05D 2260/50* (2013.01)

(58) Field of Classification Search
   CPC ..... F02K 1/72; F02K 1/70; F02K 1/78; F02K 1/80; F02K 1/82; B64D 29/06; B64D 29/08; B64D 33/04
   See application file for complete search history.

(56) References Cited

U.S. PATENT DOCUMENTS

| | | | |
|---|---|---|---|
| 4,679,750 A * | 7/1987 | Burhans ................. | B64D 29/06 244/129.4 |
| 8,398,018 B2 | 3/2013 | Ramlaoui et al. | |
| 9,233,757 B2 | 1/2016 | James et al. | |
| 9,404,507 B2 | 8/2016 | Scarr et al. | |
| 9,650,917 B2 | 5/2017 | Stewart et al. | |
| 2006/0145001 A1* | 7/2006 | Smith ................... | B64D 29/06 244/110 B |
| 2011/0272533 A1* | 11/2011 | Bourdon ................ | B64D 29/08 244/53 B |
| 2014/0116026 A1* | 5/2014 | Todorovic ................. | F02K 1/72 60/226.2 |

* cited by examiner

*Primary Examiner* — Andrew H Nguyen

(74) *Attorney, Agent, or Firm* — Getz Balich LLC

(57) ABSTRACT

An assembly is provided for an aircraft propulsion system. This assembly includes a nacelle inlet structure, a thrust reverser and a fan cowl. The thrust reverser includes a forward portion and a translating sleeve. The fan cowl is axially between the nacelle inlet structure and the translating sleeve. The fan cowl axially covers the forward portion of the thrust reverser. The fan cowl is axially structurally tied to the nacelle inlet structure. The fan cowl is radially and circumferentially structurally tied to the forward portion of the thrust reverser.

19 Claims, 11 Drawing Sheets

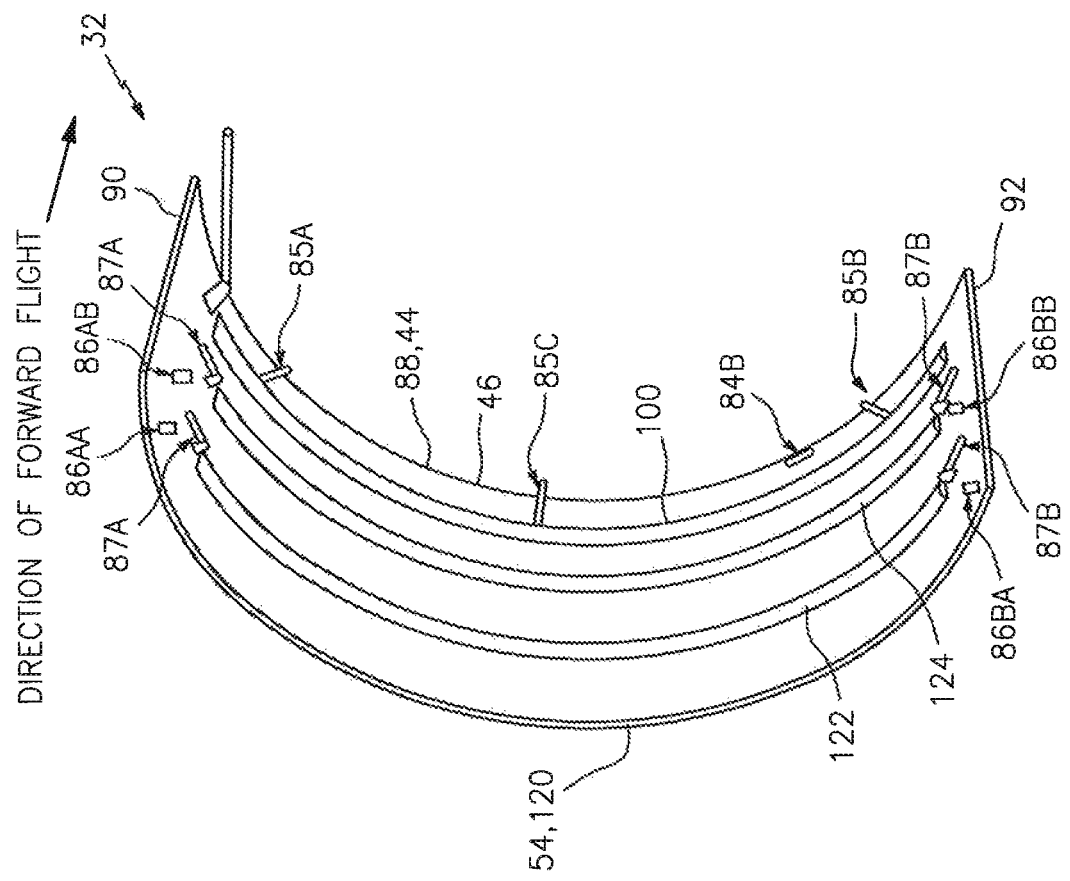
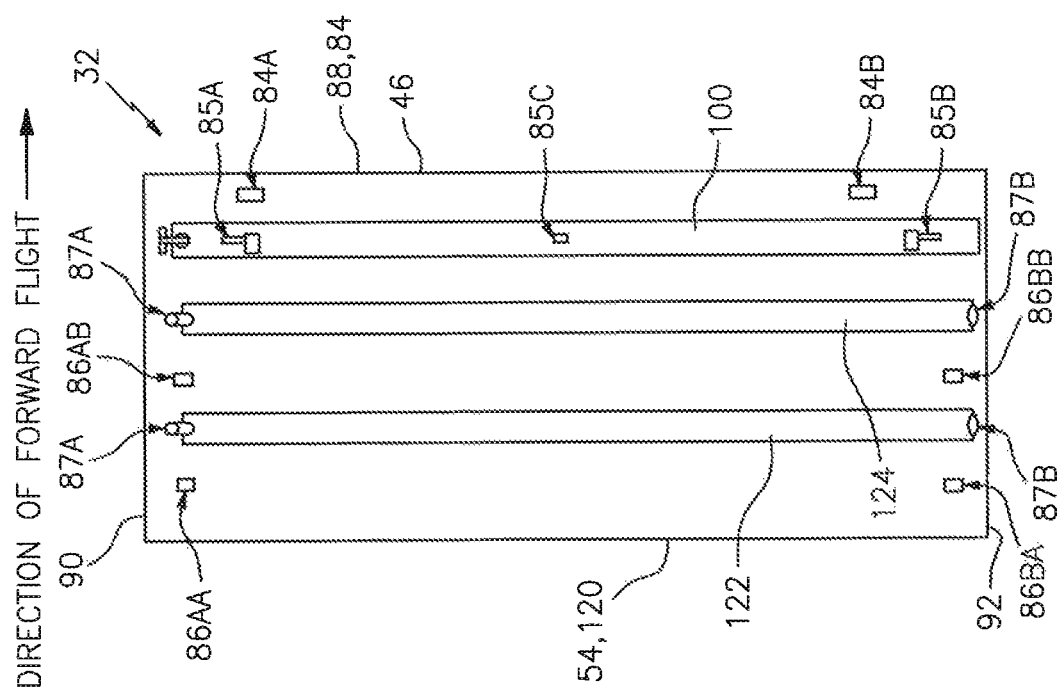

FAN COWL MOUNTED TO THRUST REVERSER

BACKGROUND

1. Technical Field

This disclosure relates generally to an aircraft propulsion system nacelle and, more particularly, to a mounting a fan cowl with the aircraft propulsion system.

2. Background Information

An aircraft propulsion system typically includes a nacelle to house a gas turbine engine. This nacelle typically includes a fan cowl, which provide an aerodynamic cover for and houses a fan case. The nacelle may also include a thrust reverser arranged aft of the fan cowl. While such an arrangement has various advantageous, it may also increase the axial length of the nacelle. There is a need in the art for a more axially compact nacelle.

SUMMARY OF THE DISCLOSURE

According to an aspect of the present disclosure, an assembly is provided for an aircraft propulsion system. This assembly includes a nacelle inlet structure, a thrust reverser and a fan cowl. The thrust reverser includes a forward portion and a translating sleeve. The fan cowl is axially located between the nacelle inlet structure and the translating sleeve. The fan cowl axially covers the forward portion of the thrust reverser. The fan cowl is axially structurally tied to the nacelle inlet structure. The fan cowl is radially and circumferentially structurally tied to the forward portion of the thrust reverser.

According to another aspect of the present disclosure, another assembly is provided for an aircraft propulsion system. This assembly includes a stationary structure, a thrust reverser and a fan cowl. The thrust reverser includes a forward portion and a translating sleeve. The thrust reverser is configured with first and second thrust reverser sections disposed on opposing sides of and pivotally connected to the stationary structure. The fan cowl extends axially to the translating sleeve and axially overlaps the forward portion of the thrust reverser. The fan cowl is configured with first and second fan cowl sections disposed on opposing sides of the stationary structure. The first fan cowl section is pivotally connected to the stationary structure through the first thrust reverser section. The second fan cowl section is pivotally connected to the stationary structure through the second thrust reverser section.

The fan cowl may be axially located between the nacelle inlet structure and an aft portion of the translating sleeve.

The fan cowl may be axially structurally tied to the nacelle inlet structure when the thrust reverser and the fan cowl are hinged closed and/or latched.

The forward portion of the thrust reverser may be configured as a non-translating forward portion of the thrust reverser.

The stationary structure may be configured as or otherwise include a pylon.

The assembly may also include a nacelle inlet structure configured with a nose lip and an outer barrel that extends axially between the nose lip and the fan cowl. The fan cowl may be substantially only axially structurally tied to the nacelle inlet structure. The fan cowl may be substantially only radially and circumferentially structurally tied to the forward portion of the thrust reverser.

The thrust reverser may also include a translating cascade. At least eighty-five percent of an axial length of the translating cascade may be axially overlapped by the fan cowl when the translating cascade is in a stowed position.

The fan cowl may be substantially axially structurally decoupled from the thrust reverser.

The fan cowl may be substantially radially and circumferentially structurally decoupled from the nacelle inlet structure.

The thrust reverser may also include a translating cascade that is substantially axially covered by the fan cowl when the translating cascade is in a stowed position.

The nacelle inlet structure may include an outer barrel. The fan cowl may extend axially from an aft end of the outer barrel to a forward end of the translating sleeve.

The assembly may also include a stationary structure. The thrust reverser may be configured with first and second thrust reverser sections disposed on opposing sides of and pivotally connected to the stationary structure. The fan cowl may be configured with first and second fan cowl sections disposed on opposing sides of the stationary structure. The first fan cowl section may be pivotally connected to the stationary structure through the first thrust reverser section. The second fan cowl section may be pivotally connected to the stationary structure through the second thrust reverser section.

The first and the second thrust reverser sections may be configured as clamshell doors.

The assembly may include an axial locator receiver and an axial locator. The axial locator receiver may be configured with the nacelle inlet structure. The axial locator may be configured with the fan cowl. The axial locator may project radially inward from the fan cowl and through a slot in the axial locator receiver. The axial locator may be axially engaged with the axial locator receiver and the axial locator may be radially and circumferentially disengaged from the axial locator receiver when the fan cowl is in a closed position.

The assembly may include a radial link extending radially between an inner link end and an outer link end. The inner link end may be mounted to the forward portion of the thrust reverser. The outer link end may be mounted to the fan cowl. The radial link may be configured to transfer substantially only radial loads between the fan cowl and the forward portion of the thrust reverser.

The fan cowl may be configured with circumferential first and second fan cowl sections. The radial link may be disposed at a forward axial edge of the circumferential first fan cowl section.

The assembly may include a radial link extending radially between an inner link end and an outer link end. The inner link end may be mounted to the forward portion of the thrust reverser through a first spherical bearing. The outer link end may be mounted to the fan cowl through a second spherical bearing.

The assembly may include a radial retainer receiver and a radial retainer. The radial retainer receiver may be configured with the forward portion of the thrust reverser. The radial retainer may include an arm and a slider. The arm may project radially inward from the fan cowl to the slider. The slider may be mated and axially slidably within a slot in the radial retainer receiver.

The fan cowl may be configured with circumferential first and second fan cowl sections. The radial retainer may be disposed at a circumferential edge of the circumferential first fan cowl section.

The assembly may include a lateral link extending laterally between a first link end and a second link end. The first link end may be mounted to the forward portion of the thrust reverser. The second link end may be mounted to the fan cowl. The lateral link may be configured to transfer substantially only lateral loads between the fan cowl and the forward portion of the thrust reverser.

The lateral link may also be configured to cause the fan cowl to conform to the forward portion of the thrust reverser; e.g., a fixed structure.

The fan cowl may be configured with circumferential first and second fan cowl sections. The lateral link may be disposed at a circumferential edge of the circumferential first fan cowl section.

The assembly may include a lateral link extending laterally between a first link end and a second link end. The first link end may be mounted to the forward portion of the thrust reverser through a first spherical bearing. The second link end may be mounted to the fan cowl through a second spherical bearing.

The foregoing features and the operation of the invention will become more apparent in light of the following description and the accompanying drawings.

BRIEF DESCRIPTION OF THE DRAWINGS

FIG. 6 is an inside side illustration of an exemplary fan cowl section.

FIG. 7 is a perspective illustration of the fan cowl section.

DETAILED DESCRIPTION

Figure 1:
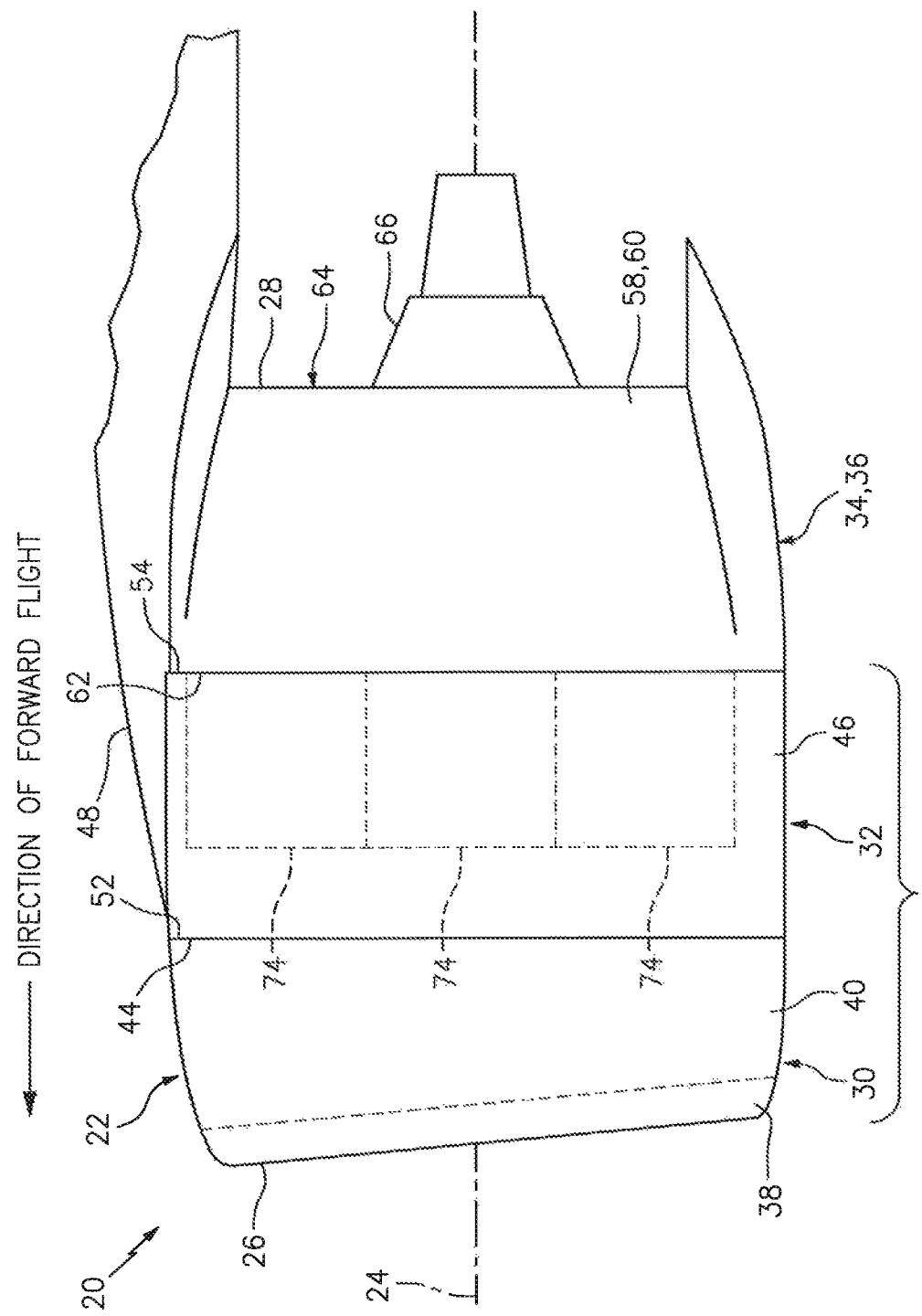
FIG. 1 is a side illustration of an aircraft propulsion system with a thrust reverser in a stowed position.

FIG. 1 illustrates an aircraft propulsion system 20 for an aircraft such as, but not limited to, a commercial airliner or cargo plane. The propulsion system 20 includes a nacelle 22 and a gas turbine engine. This gas turbine engine may be configured as a high-bypass turbofan engine. Alternatively, the gas turbine engine may be configured as any other type of gas turbine engine capable of propelling the aircraft during flight.

The nacelle 22 is configured to house and provide an aerodynamic cover for the gas turbine engine. The nacelle 22 extends axially along an axial centerline 24 between a nacelle forward end 26 and a nacelle aft end 28. The nacelle 22 of FIG. 1 includes a nacelle inlet structure 30, a fan cowl 32 and a nacelle aft structure 34, at least a portion of which is configured as part of a thrust reverser 36.

The inlet structure 30 is disposed at the nacelle forward end 26. The inlet structure 30 is configured to direct a stream of air through an inlet opening at the nacelle forward end 26 and into a fan section of the gas turbine engine. The inlet structure 30 of FIG. 1 includes a nose lip 38, a radial outer barrel 40 and a radial inner barrel (hidden in FIG. 1 beneath the outer barrel 40). This inner barrel may be configured as a full hoop body, and extends axially aft along the centerline 24 from the nose lip 38 to (or towards) a fan case 42 (see FIG. 2). The outer barrel 40 may be configured as a full hoop body, and extends axially aft along the centerline 24 from the nose lip 38 to an axial forward end 44 of the fan cowl 32. At least the nose lip 38 and the outer barrel 40 may be formed as an axially unitary (e.g., monolithic, continuous) body as shown in FIG. 1; however, the present disclosure is not limited to such an exemplary configuration. For example, in other embodiments, the nose lip 38 and the outer barrel 40 may be discretely formed bodies that are connected together.

The fan cowl 32 of FIG. 1 is configured with a plurality of fan cowl sections 46; e.g., a pair of fan cowl halves, where one such fan cowl half is visible in FIG. 1. These fan cowl sections 46 are disposed on opposing lateral (e.g., circumferential or tangential) sides of the propulsion system 20 as well as on opposing lateral sides of a stationary structure such as a pylon 48. The fan cowl 32 and each of its fan cowl sections 46 are disposed axially between the inlet structure 30 and the aft structure 34. More particularly, each fan cowl section 46 extends axially along the centerline 24 from an axially aft end 52 of the inlet structure 30 to an axial aft end 54 of a stationary portion 56 of the nacelle 22. The forward end 44 of the fan cowl 32 may axially overlap an aft portion of the inlet structure 30 as shown in FIG. 3, which may provide a radial land on which the fan cowl 32 may be clamped against to improve, for example, steps, gaps and/or scooping control. In this manner, a seal (not shown) may be configured radially between the fan cowl 32 and the inlet structure 30. Briefly, while a radial compressive load may be transferred radially between the elements 32 and 30 through the seal, there is no attachment at this interface and, thus, the fan cowl 32 may be described as being radially decoupled from the inlet structure 30 at the interface. Referring again to FIG. 1, each fan cowl section 46 is generally axially aligned with a fan section of the gas turbine engine. The fan cowl sections 46 are configured to collectively provide an aerodynamic covering for the fan case 42; see FIG. 2. Briefly, this fan case 42 circumscribes the fan section and partially forms a forward outer peripheral boundary of a bypass flowpath of the propulsion system 20.

The term "stationary portion" is used above to describe a portion of the nacelle 22 that is stationary during propulsion system operation (e.g., during takeoff, aircraft flight and landing). However, the stationary portion 56 may be otherwise movable for propulsion system inspection/maintenance; e.g., when the propulsion system 20 is non-operational. For example, as described below in further detail, each of the fan cowl sections 46 is configured to provide access to components of the gas turbine engine such as the fan case 42 and/or peripheral equipment configured therewith for inspection, maintenance and/or otherwise.

The aft structure 34 is configured as or otherwise includes a translating sleeve 58 for the thrust reverser 36. The translating sleeve 58 includes a pair of sleeve sections 60; e.g., a pair of sleeve halves, where one such sleeve half is visible in FIG. 1. This sleeve sections 60 are disposed on opposing sides of the propulsion system 20 as well as on opposing lateral sides of the stationary structure. The translating sleeve 58 of FIG. 1 and each of its sleeve sections 60 are disposed at the nacelle aft end 28. The sleeve sections 60 extend axially along the axial centerline 24 between a forward end 62 of the aft structure 34 and the nacelle aft end 28. The sleeve sections 60 are configured to collectively partially form an aft outer peripheral boundary of the bypass flowpath. The sleeve sections 60 may also be configured to form a bypass nozzle 64 for the bypass flowpath with an inner structure 66 of the nacelle 22 (e.g., an inner fixed structure (IFS)), which nacelle inner structure 66 houses a core of the gas turbine engine.

Figure 2:
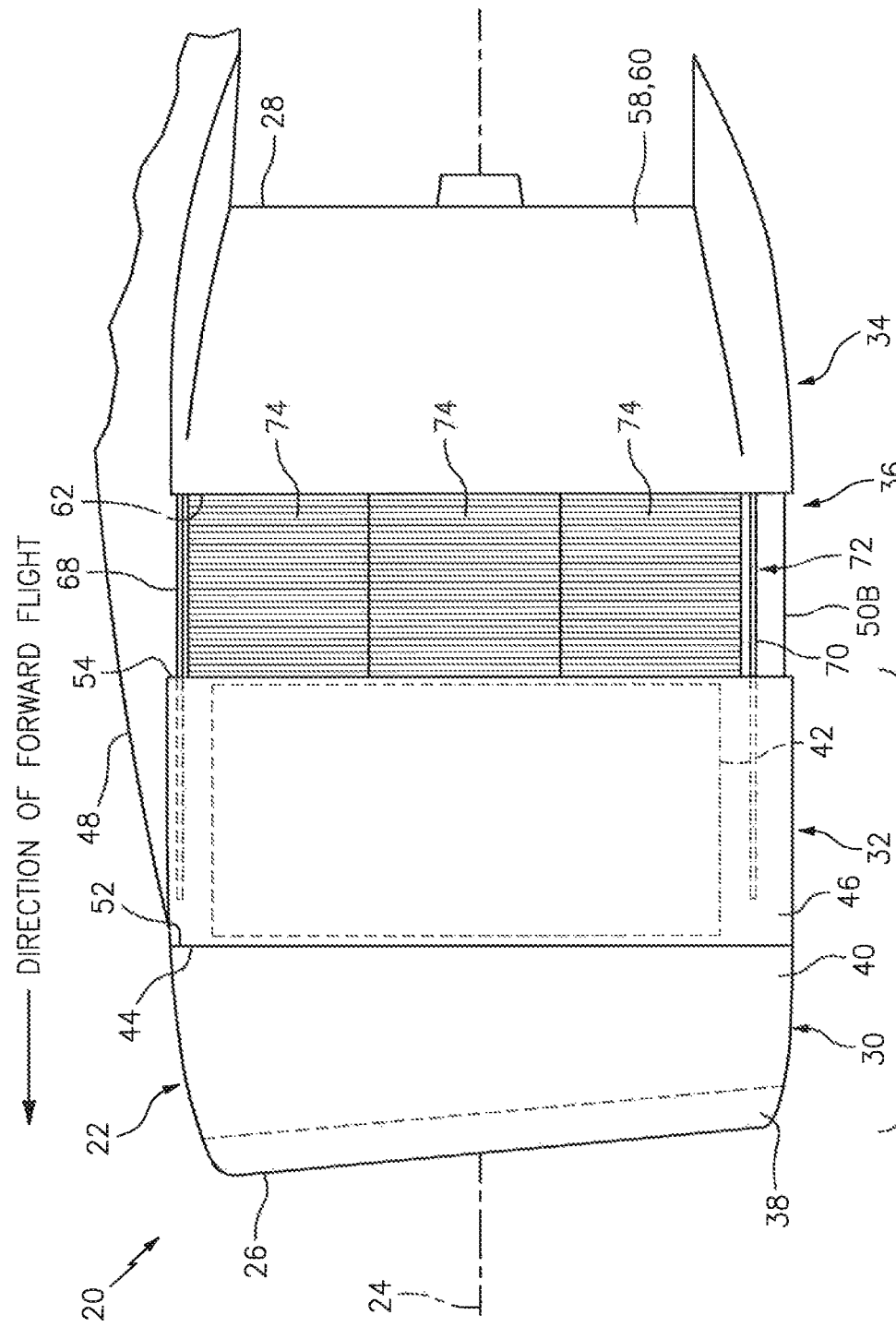
FIG. 2 is a side illustration of the aircraft propulsion system with the thrust reverser in a deployed position.
Figure 3:
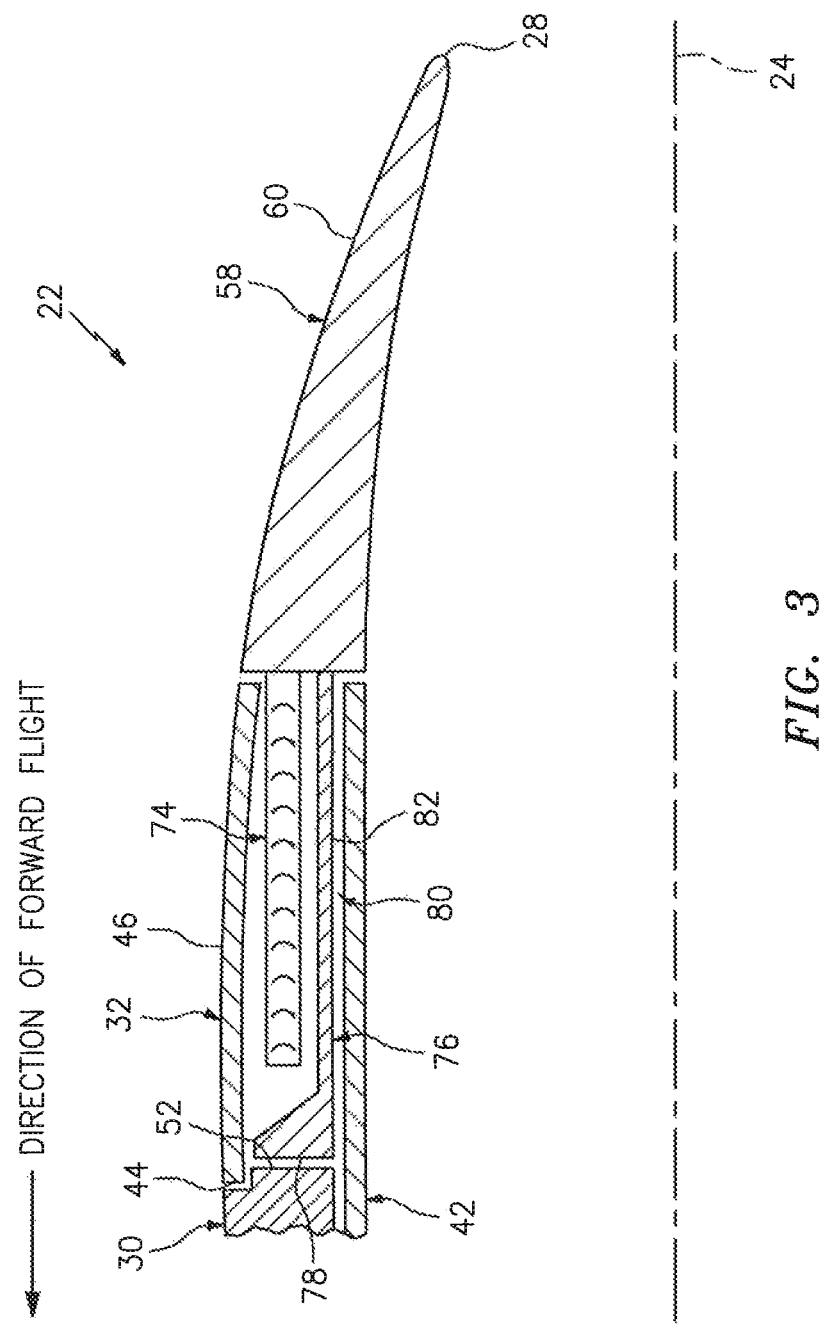
FIG. 3 is a partial schematic side sectional illustration of an aft portion of a nacelle with the thrust reverser in the stowed position.

Referring to FIGS. 1 and 2, the translating sleeve 58 is an axially translatable structure, which may also include one or more cascades 74. Each sleeve section 60, for example, may be slidably connected to one or more stationary structures such as, but not limited to, upper beams 50A attached to the pylon 48 and lower beams 50B through one or more respective track assemblies 68 and 70 (see FIGS. 2, 4 and 5). Each track assembly 68, 70 may include a rail mated with a track beam; however, the present disclosure is not limited to the foregoing exemplary sliding connection configuration.

With the foregoing configuration, the translating sleeve 58 may translate axially along the axial centerline 24 and relative to the stationary portion 56. The translating sleeve 58 may thereby move axially between a forward stowed position (see FIG. 1) and an aft deployed position (see FIG. 2). In the forward stowed position, the translating sleeve 58 provides the functionality described above. In the aft deployed position, the translating sleeve 58 opens a thrust reverser passage 72 and reveals/provides room for one or more other components of the thrust reverser 36 such as, but not limited to, the one or more cascades 74. In addition, as the translating sleeve 58 moves from the stowed position to the deployed position, one or more blocker doors (not shown) arranged with the translating sleeve 58 may be deployed to divert bypass air from the bypass flowpath and through the thrust reverser passage 72 and the cascades 74 therein to provide reverse thrust.

The cascades 74 of FIGS. 1 and 2 are configured as translating cascades. More particularly, the cascades 74 are configured to translate axially along the centerline 24 between a forward, stowed position (see FIG. 1) and an aft, deployed position (see FIG. 2). In the stowed position, the cascades 74 may be partially or completely axially covered/overlapped by the fan cowl 32; e.g., at least 75-85% to 100% axially covered. Briefly, this enables an overall axial length of the nacelle 22 to be shorter than a traditional nacelle with cascades that are positioned aft of an associated fan cowl even when stowed. In the deployed position of FIG. 2, the cascades 74 may be arranged partially or completely within the thrust reverser passage 72 and aft of the fan cowl 32. The actuation of the cascades 74 may be tied to the actuation of the translating sleeve 58. Alternatively, the translating cascades 74 may be discretely actuated from the translating sleeve 58, but actuation of the cascades 74 may still be synchronized with actuation of the translating sleeve 58.

Referring to FIG. 3, to enable positioning of the cascades 74 radially within the fan cowl 32 when in the stowed position of FIG. 1, a forward portion 76 (e.g., a stationary framework) of the thrust reverser 36 is arranged radially within the fan cowl 32. This forward portion 76 of the thrust reverser 36 is configured to receive the cascades 74 when in the stowed position. The forward portion 76 projects axially along the centerline 24 to a forward end 78 of the thrust reverser 36, which may be located at (e.g., on, adjacent or proximate) the forward end 44 of the fan cowl 32 and/or the aft end 52 of the inlet structure 30. With such a configuration, the forward portion 76 of the thrust reverser 36 may axially overlap a substantial portion (e.g., at least 80-90%) of an axial length of the fan cowl 32 as well as a major portion (e.g., at least 55-75%) of an axial length of the fan case 42. In this manner, the forward portion 76 of the thrust reverser 36 is positioned within a cavity formed radially between the fan case 42 and the fan cowl 32.

Figure 4:
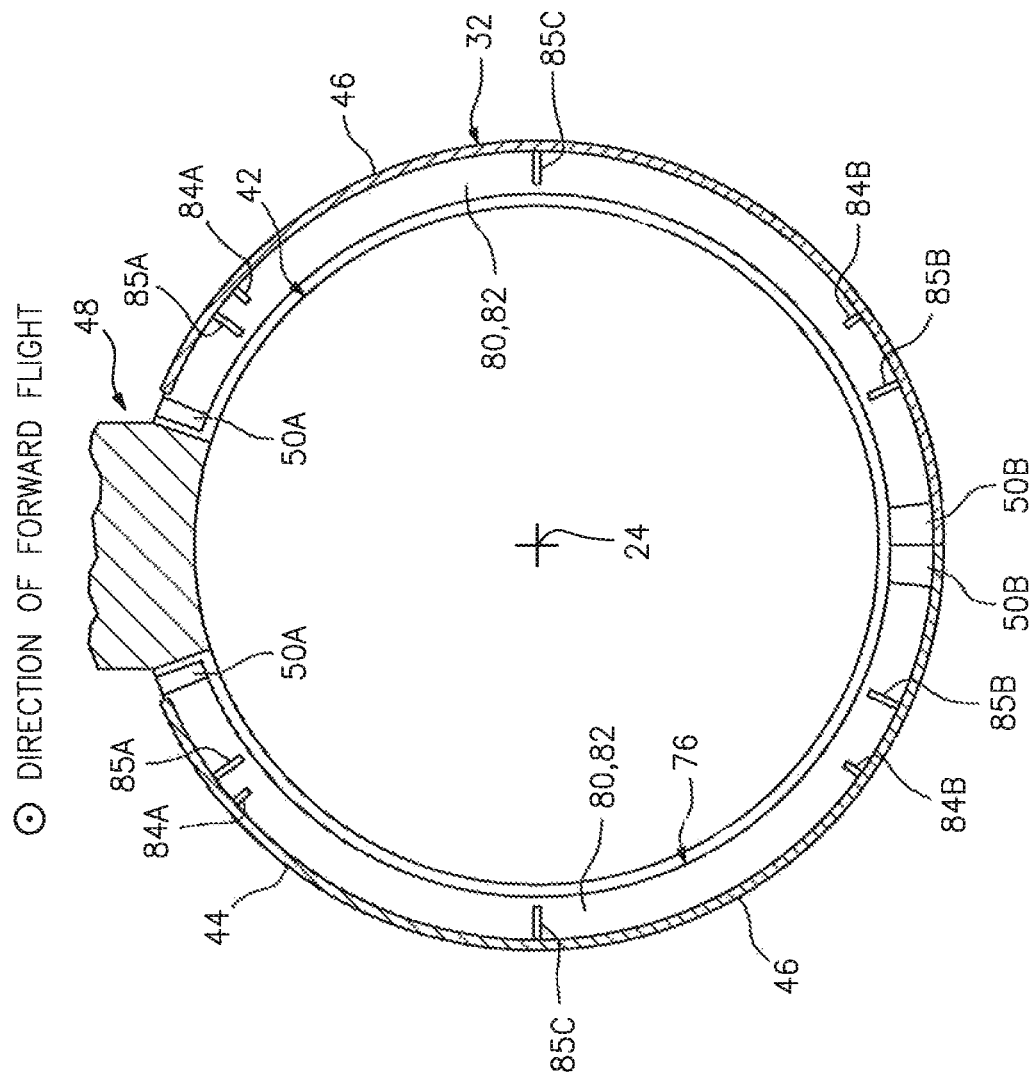
FIG. 4 is an aft looking schematic cross-sectional illustration of the aircraft propulsion system with thrust reverser sections and fan cowl sections in closed positions.
Figure 5:
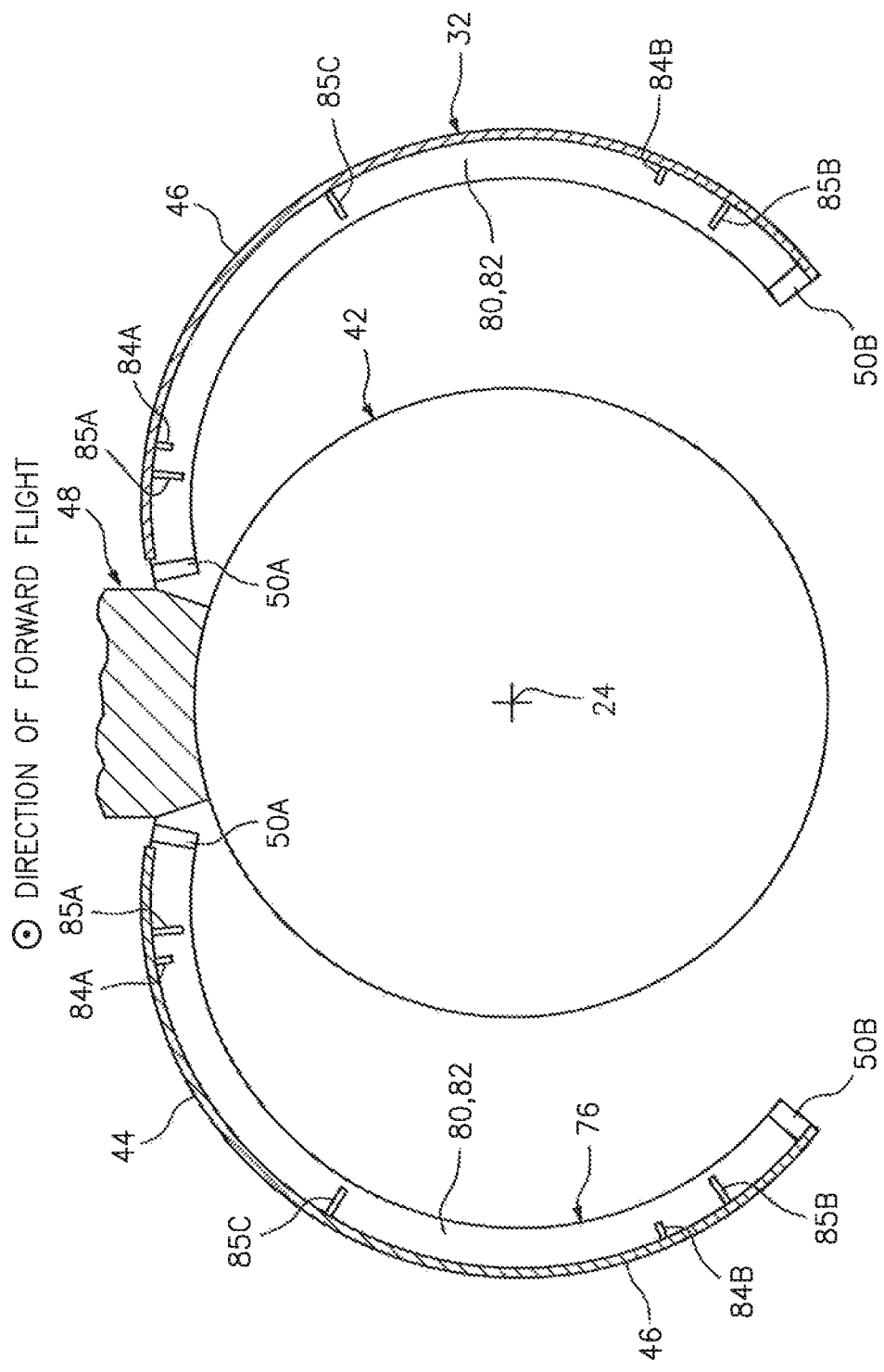
FIG. 5 is an aft looking schematic cross-sectional illustration of the aircraft propulsion system with the thrust reverser sections and the fan cowl sections in open positions.

Since the thrust reverser 36 and, more particularly, its elements 74 and 76 axially cover a major portion of the fan case 42, merely pivoting open the fan cowl sections 46 may not provide full access to the fan case 42 and its peripherals since the forward portion 76 and the cascades 74 would block this access thereto. Therefore, the thrust reverser 36 is configured with a plurality of thrust reverser sections 80 as shown in FIGS. 4 and 5; e.g., a pair of thrust reverser halves. These thrust reverser sections 80 are disposed on opposing lateral sides of the propulsion system 20 as well as on opposing lateral sides of the pylon 48. Each of these thrust reverser sections 80 includes at least a respective section 82 (e.g., half) of the forward portion 76, one or more respective cascades 74, and a respective sleeve section 60. Each thrust reverser section 80 is pivotally connected to the stationary structure via hinge(s). This enables each thrust reverser section 80 to pivot (swing) between a closed position (see FIG. 4) and an open position (see FIG. 5). Each thrust reverser section 80 is configured with a respective one of the upper beams 50A and a respective one of the lower beams 50B. The upper beams 50A and the lower beams 50B each contains a respective one of the tracks on which the sleeve slides. The lower beams 50B latch to one another when the thrust reverser sections 80 are closed.

Each of the fan cowl sections 46 is fixedly mounted to a respective one of the thrust reverser sections 80 and removably mounted to the inlet structure 30 as described below in further detail. As a result, when the thrust reverser sections 80 are moved from the closed position of FIG. 4 to the open position of FIG. 5, the fan cowl sections 46 are opened and additional (e.g., substantially full) access is provided to the fan case 42 and one or more peripherals mounted thereto.

Various attachments 84-87 (e.g., linkages/mounting structures) may be used to mount the fan cowl 32 to the nacelle components 30 and 76. Referring to FIGS. 6 and 7, these attachments may include, but are not limited to, axial attachments 84A and 84B (generally referred to as "84"), radial attachments 85A, 85B and 85C (generally referred to as "85"), and 86AA, 86AB, 86BA and 86BB (generally referred to as "86") and lateral (e.g., circumferential or tangential) attachments 87A and 87B (generally referred to as "87"). The term "axial attachment" may describe an attachment that facilitates substantially only axial load transfer between two bodies. The term "radial attachment" may describe an attachment that facilitates substantially only radial load transfer between two bodies. The term "lateral attachment" may describe an attachment that facilitates substantially only lateral (e.g., circumferential or tangential) load transfer between two bodies.

The axial attachments 84 may be used to axially structurally tie and thereby axially mount the fan cowl 32 to the inlet structure 30. The radial attachments 85 and 86 may be used to radially structurally tie and thereby radially mount the fan cowl 32 to the forward portion 76 of the thrust reverser 36. The lateral attachments 87 may be used to laterally structurally tie and thereby laterally mount the fan cowl 32 to the forward portion 76 of the thrust reverser 36. Exemplary embodiments of such attachments and locations thereof are described below with reference to FIGS. 6-13. The present disclosure, however, is not limited to the specific exemplary attachment embodiments or attachment locations described below. Rather, one or more other attachment types may also or alternatively be used to axially mount the fan cowl 32 to the inlet structure 30 or radially and/or laterally mount the fan cowl 32 to the forward portion 76 of the thrust reverser 36.

One or more of the axial attachments 84 may be arranged with each fan cowl section 46. The axial attachments 84 of FIGS. 6 and 7 are located at (e.g., on, adjacent or proximate) a forward edge 88 of the respective fan cowl section 46 and, thus, at the forward end 44 of the fan cowl 32. The upper axial attachment 84A may be located proximate a circumferential upper edge 90 of the fan cowl section 46. The lower axial attachment 84B may be located proximate a circumferential lower edge 92 of the fan cowl section 46.

Figure 8:
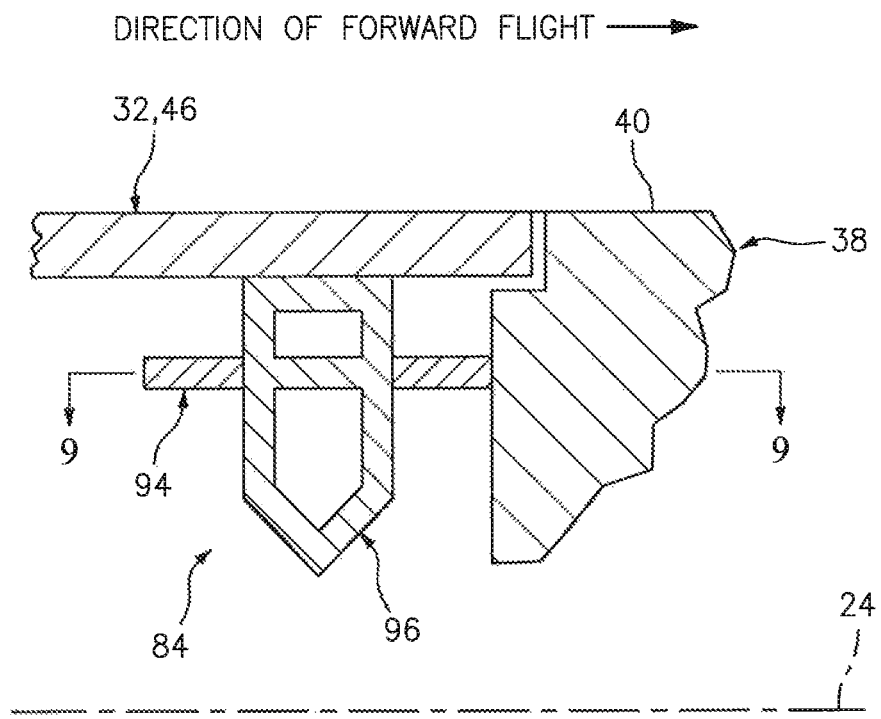
FIG. 8 is a side sectional illustration of an axial attachment between two components.
Figure 9:
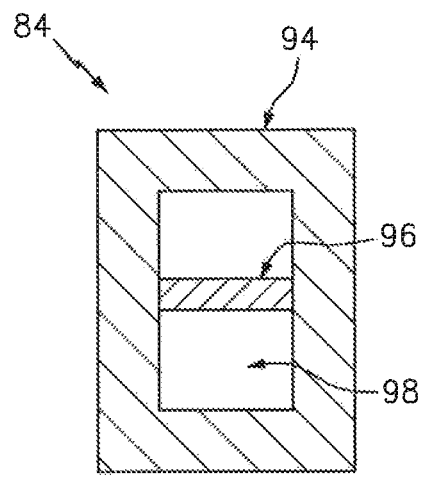
FIG. 9 is a sectional illustration of the axial attachment taken along the line in FIG. 8.

Each axial attachment 84 of FIGS. 8 and 9 includes an axial locator receiver 94 and an axial locator 96. The axial locator receiver 94 is configured with (e.g., attached to) the nacelle inlet structure 30. This axial locator receiver 94 is configured as an annular plate with a central slot 98 (e.g., a through-hole).

The axial locator 96 is configured with (e.g., attached to) the respective fan cowl section 46. This axial locator 96 projects radially inward from the fan cowl 32 and through (or partially into) the slot 98 in the axial locator receiver 94. The axial locator 96 may axially engage (e.g., contact) a forward portion and/or an aft portion of the axial locator receiver 94, which function as axial stops for the axial locator 96. By contrast, lateral gaps extend laterally respectively between the axial locator 96 and opposing lateral portions of the axial locator receiver 94. As a result, the axial locator 96 is laterally disengaged from the axial locator receiver 94. The axial locator 96 is also radially disengaged from the axial locator receiver 94 since the axial locator 96 may translate radially back and forth within (or completely out of) the slot 98. This axial locator 96 therefore is configured to transfer substantially only axial loads between the fan cowl section 46 and the inlet structure 30 as well as disengageable attachment between the fan cowl section 46 and the inlet structure 30. The axial locator 96 is also operable to maintain a specified axial gap between the fan cowl section 46 and the outer barrel 40.

Referring to FIGS. 6 and 7, one or more of the radial attachments 85 may be arranged with each fan cowl section 46. The radial attachments 85 of FIGS. 6 and 7 are located at (e.g., on, adjacent or proximate) the forward edge 88 of the respective fan cowl section 46. In the specific embodiment of FIGS. 6 and 7, the radial attachments 85 are axially aligned with a forward-most fan cowl stiffener 100 proximate the forward edge 88. The upper radial attachment 85A may be located at the upper edge 90 of the fan cowl section 46. The lower radial attachment 85B may be located at the lower edge 92 of the fan cowl section 46. The intermediate radial attachment 85C may be located (e.g., centrally) circumferentially between the upper radial attachment 85A and the lower radial attachment 85B.

Figure 10:
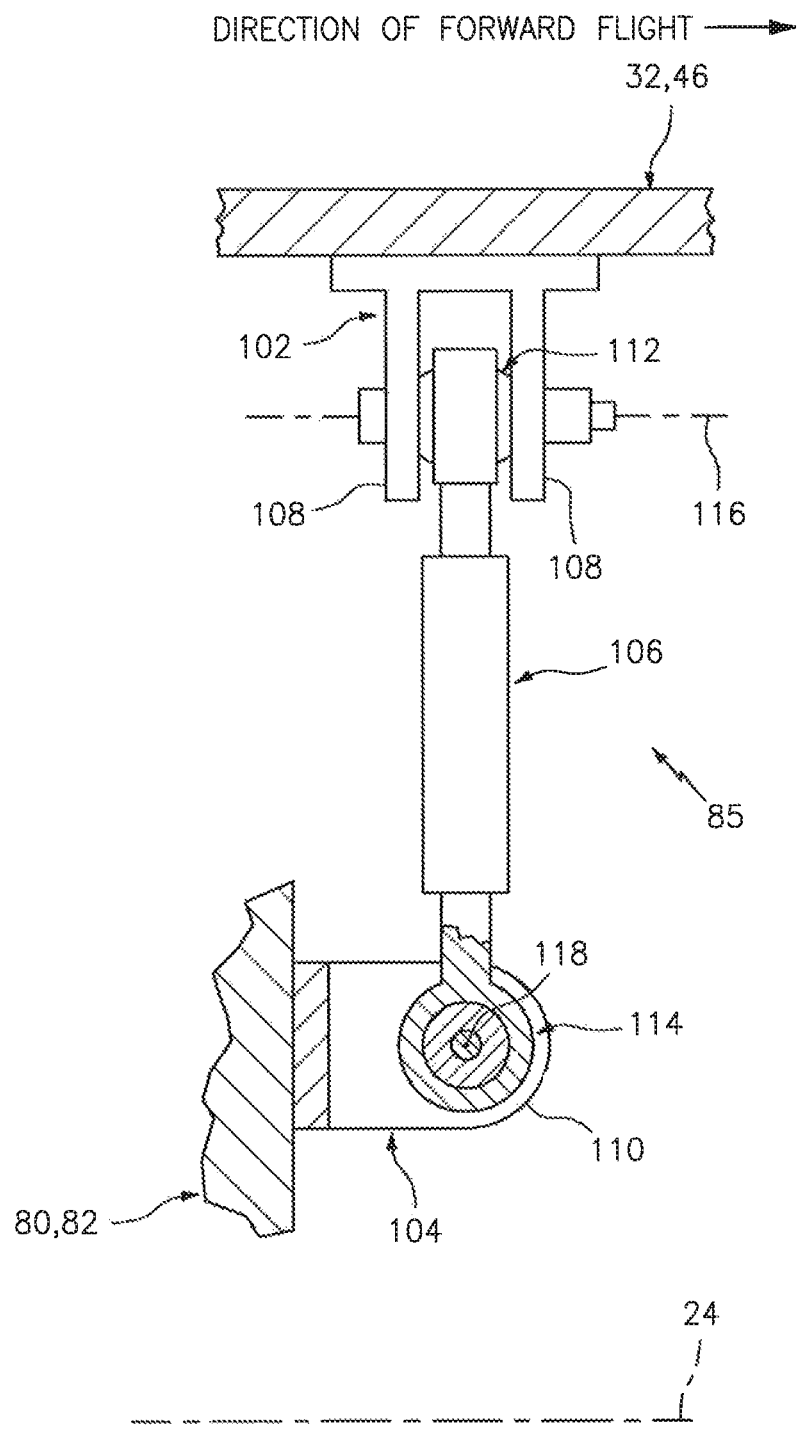
FIG. 10 is a cutaway illustration of a radial attachment between two components.
Figure 11:
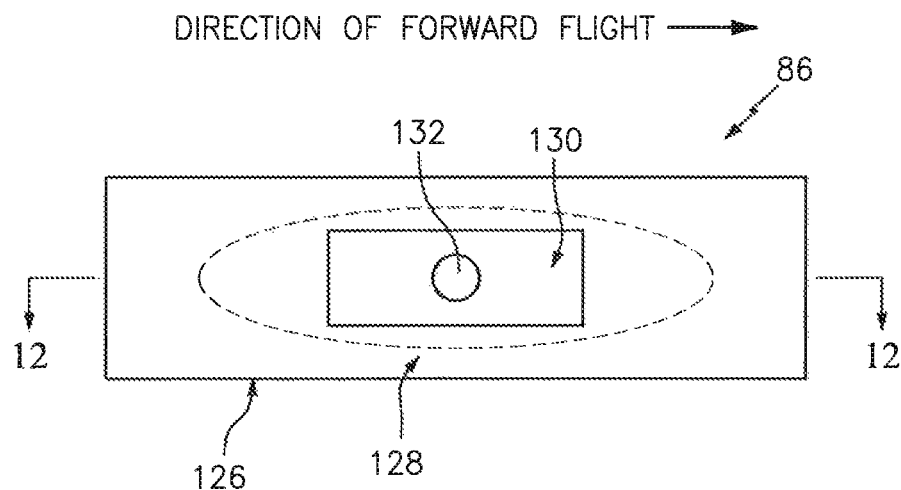
FIG. 11 is a side sectional illustration of another radial attachment.

Each radial attachment 85 of FIG. 10 includes an outer mount 102, an inner mount 104 and a radial link 106. The outer mount 102 is configured with (e.g., attached to) the respective fan cowl section 46. The outer mount 102 of FIG. 10 includes a pair of mounting flanges 108.

The inner mount 104 is configured with (e.g., attached to) the respective thrust reverser section 80 and, more particularly, its section 82 of the forward portion 76 of the thrust reverser 36. The inner mount 104 of FIG. 10 includes a pair of mounting flanges 110 (one shown in FIG. 10).

The radial link 106 extends radially between an outer ink end and an inner link end. The radial link 106 of FIG. 10 is configured as a turnbuckle with outer and inner spherical bearings 112 and 114, where the outer spherical bearing 112 is located at the outer link end and the inner spherical bearing 114 is located at the inner link end. The radial link 106 is attached to the outer mount 102 through the outer spherical bearing 112, which is disposed between the flanges 108 and connected to the flanges 108 by a fastener. The radial link 106 is attached to the inner mount 104 through the inner spherical bearing 114, which is disposed between the flanges 110 and connected to the flanges 110 by a fastener. The spherical bearings 112 and 114 of FIG. 10 are arranged such that an axis 116 of the outer spherical bearing 112 is substantially perpendicular to an axis 118 of the inner spherical bearing 114; however, the present disclosure is not limited to such a spherical bearing arrangement. These spherical bearings 112 and 114 enable a stiff structural connection radially between the fan cowl section 46 and the section 82 of the forward portion 76 of the thrust reverser 36. By contrast, the spherical bearings 112 and 114 allow side-to-side pivoting. As a result, the radial link 106 is operable to transfer substantially only radial loads (thus, substantially no axial or lateral loads) between the nacelle components 46 and 82. The radial link 106 is also operable to maintain a specified radial alignment between outer surfaces of the fan cowl section 46 and the outer barrel 40, which can be adjusted as need via the turnbuckle.

Referring to FIGS. 6 and 7, one or more of the radial attachments 86 may be arranged with each fan cowl section 46. The radial attachments 86 of FIGS. 6 and 7 are located towards an aft edge 120 of the respective fan cowl section 46. More particularly, the radial attachments 86AB and 86BB are located axially (e.g., centrally) between two aftmost fan cowl stiffeners 122 and 124. The radial attachments 86AA and 86BA are located axially (e.g., centrally) between the aftmost fan cowl stiffener 122 and the aft edge 120 of the fan cowl section 46. The upper radial attachments 86AA and 86AB may be located at the upper edge 90 of the fan cowl section 46. The lower radial attachments 86BA and 86BB may be located at the lower edge 92 of the fan cowl section 46.

Each radial attachment 86 can be a link or a retainer as described in case there is no space to design a clevis at both ends. Each radial attachment 86 (e.g., radial retainer) of FIGS. 11 and 12 includes a radial retainer receiver 126 and a radial retainer 128. The radial retainer receiver 126 is configured with (e.g., attached to) the forward portion section 82. This radial retainer receiver 126 is configured as an annular plate with a central slot 130 (e.g., a through hole).

Figure 12:
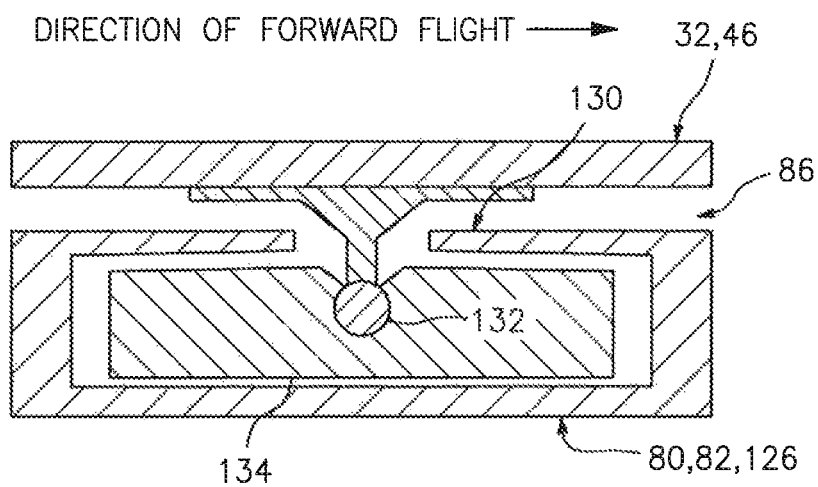
FIG. 12 is a sectional illustration of the radial attachment of FIG. 11 between two components, which is taken along the line 12-12 in FIG. 11.

The radial retainer 128 is configured with (e.g., attached to) the respective fan cowl section 46. The radial retainer 128 of FIGS. 11 and 12 includes an arm 132 and a slider 134. The arm 132 projects radially inward from the fan cowl section 46 to the slider 134. The arm 132 of FIG. 12 is attached to the slider 134. The slider 134 is mated within the slot 130 in the radial retainer receiver 126. The slider 134 is also adapted to slide axially within the slot 130. With the foregoing configuration, the radial retainer 128 is operable to transfers substantially only radial loads (e.g., not axial or lateral loaded) between the fan cowl section 46 and the forward portion section 82. The radial retainer 128 is also operable to maintain a specified radial alignment of the outer surface of the fan cowl section 46 with a circumferentially adjacent outer surface.

Referring to FIGS. 6 and 7, one or more of the lateral attachments 87 may be arranged with each fan cowl section 46. The lateral attachments 87 of FIGS. 6 and 7 are located at (e.g., on, adjacent or proximate) opposing ends of the aftmost fan cowl stiffeners 122 and 124. The upper lateral attachments 87A may be located at the upper edge 90 of the fan cowl section 46. The lower lateral attachments 87B may be located at the lower edge 92 of the fan cowl section 46.

Figure 13:
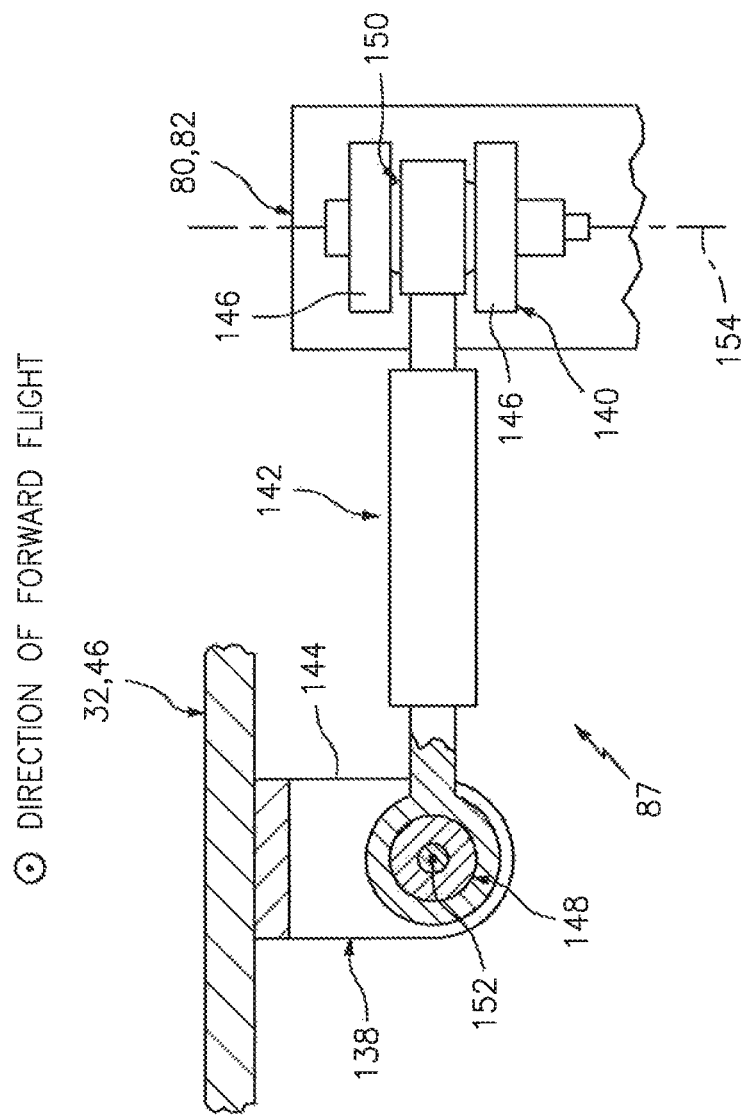
FIG. 13 is an aft looking cutaway illustration of a lateral attachment between two components.

Each lateral attachment 87 of FIG. 13 includes a first mount 138, a second mount 140 and a lateral link 142. The first mount 138 is configured with (e.g., attached to) the respective fan cowl section 46. The first mount 138 of FIG. 13 includes a pair of mounting flanges 144 (one shown in FIG. 13).

The second mount 140 is configured with (e.g., attached to) the respective thrust reverser section 80 and, more particularly, the respective forward portion section 82 of the thrust reverser 36. The second mount 140 of FIG. 13 includes a pair of mounting flanges 146.

The lateral link 142 extends laterally (e.g., circumferentially or tangentially) between a first link end and a second link end. The lateral link 142 of FIG. 13 is configured as a turnbuckle with first and second spherical bearings 148 and 150, where the first spherical bearing 148 is located at the first link end and the second spherical bearing 150 is located at the second link end. The lateral link 142 is attached to the first mount 138 through the first spherical bearing 148, which is disposed between the flanges 144 and connected to the flanges 144 by a fastener. The lateral link 142 is attached to the second mount 140 through the second spherical bearing 150, which is disposed between the flanges 126 and connected to the flanges 146 by a fastener. The spherical bearings 148 and 150 of FIG. 13 are arranged such that an axis 152 of the first spherical bearing 148 is substantially perpendicular to an axis 154 of the second spherical bearing 150; however, the present disclosure is not limited to such a spherical bearing arrangement. These spherical bearings 148 and 150 enable a stiff structural connection laterally between the fan cowl section 46 and the forward portion section 82 of the thrust reverser 36. By contrast, the spherical bearings 148 and 150 allow side-to-side pivoting. As a result, the lateral link 142 is operable to transfer substantially only lateral loads (thus, substantially no axial or radial loads) between the nacelle components 46 and 82. The lateral link 142 is also operable to maintain a specified lateral gap between the fan cowl section 46 and an adjacent structure, which gap may be adjusted via the turnbuckle.

Figure 14:
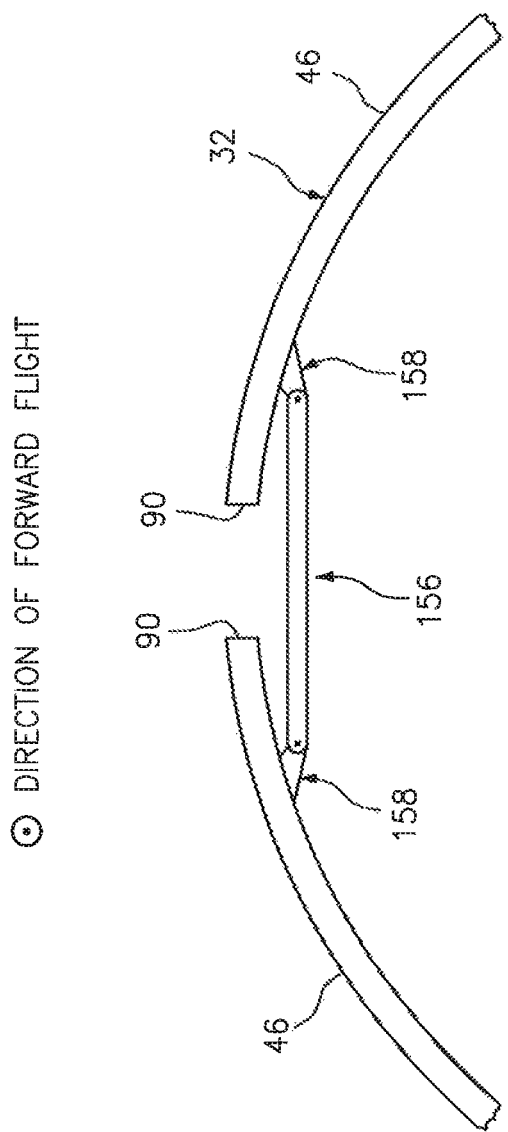
FIG. 14 front side illustration of a floating beam attached between two fan cowl sections.

Referring to FIG. 14, in some embodiments, a floating beam 156 may be included to structurally link the two fan cowl sections 46 together proximate their upper edges 90. This floating beam 156 extends laterally between two opposing ends, where each end is attached to a mount 158 attached to a respective one of the fan cowl sections 46.

As described above, embodiments of the disclosed nacelle structure above include mounts that support the fan cowl from the hinging thrust reverser sections. The mounts may enable the fan cowl to float forward and aft relative to the thrust reverser. The axial locators on the fan cowl engage the inlet structure, which may ensure that, in flight, the fan cowl is coupled axially to the inlet structure. This axial coupling can improve aerodynamic performance since the axial gap between the fan cowl and the inlet structure is controlled.

In some embodiments, the attachments 84 and/or 87 and the radial land formed at the aft end of the inlet structure 30 may be configured to provide a radial constraint for the fan cowl 32. For example, the attachments 84 and/or 87 may be configured to pull the fan cowl 32 against the radial land of the inlet structure 30.

In some embodiments, the attachments 84 and/or 87 as well as any combination of the attachments 85, 86, 86AA and/or 86BA may be configured to control radial (e.g., in flight) deflection to improve radial step and/or axial gap control as well as reduce scooping.

The nacelle structure described above may provide improved radial step and/or axial gap control at the interface between the inlet structure 30 and the fan cowl 32.

The nacelle structure described above may also be able to reduce overall nacelle weight compared to a typical prior art nacelle structure where the fan cowl is forward and discrete from the thrust reverser system. For example, weight may be reduced since the fan cowl 32 may be directly supported by the thrust reverser (in both the open and closed positions) at the upper end via the lateral links to the beam 50A and at the lower end via the lateral links to the lower beam 50B (also more if attachments 85 and/or 86 are included). Designing the nacelle structure for, for example, a single failure condition may not significantly increase weight as it would with conventional cowls due to the ability to introduce alternative load paths anywhere between the fan cowl 32 and the forward (e.g., fixed) portion of the thrust reverser via attachments 85 and 86. In addition, tying the fan cowl to the thrust reverser eliminates a requirement for a dedicated fan cowl opening system, which increases weight, that must be sized to accommodate and operable to transmit and withstand of wind loads as well as a single failure condition. Such a dedicated fan cowl opening system would also need to be sized and configured to hold open the fan cowl doors, which further increases weight.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:
1. An assembly for an aircraft propulsion system, comprising:
 a nacelle inlet structure;
 a thrust reverser including a forward portion and a translating sleeve;
 a fan cowl located axially between the nacelle inlet structure and the translating sleeve, the fan cowl axially covering the forward portion of the thrust reverser, the fan cowl axially structurally tied to the nacelle inlet structure, and the fan cowl radially and circumferentially structurally tied to the forward portion of the thrust reverser; and a radial link extending radially between an inner link end and an outer link end, the inner link end mounted to the forward portion of the thrust reverser, and the outer link end mounted to the fan cowl;

wherein the radial link is configured to transfer substantially only radial loads between the fan cowl and the forward portion of the thrust reverser.

2. The assembly of claim 1, wherein the fan cowl is substantially axially structurally decoupled from the thrust reverser.

3. The assembly of claim 1, wherein the fan cowl is substantially radially and circumferentially structurally decoupled from the nacelle inlet structure.

4. The assembly of claim 1, wherein the thrust reverser further includes a translating cascade that is substantially axially covered by the fan cowl when the translating cascade is in a stowed position.

5. The assembly of claim 1, wherein the nacelle inlet structure comprises an outer barrel, and the fan cowl extends axially from an aft end of the outer barrel to a forward end of the translating sleeve.

6. The assembly of claim 1, further comprising a stationary structure, wherein
the thrust reverser is configured with first and second thrust reverser sections disposed on opposing sides of and pivotally connected to the stationary structure;
the fan cowl is configured with first and second fan cowl sections disposed on opposing sides of the stationary structure;
the first fan cowl section is pivotally connected to the stationary structure through the first thrust reverser section; and
the second fan cowl section is pivotally connected to the stationary structure through the second thrust reverser section.

7. The assembly of claim 6, wherein the first and the second thrust reverser sections are configured as clamshell doors.

8. The assembly of claim 1, further comprising:
an axial locator receiver configured with the nacelle inlet structure; and
an axial locator configured with the fan cowl, the axial locator projecting radially inward from the fan cowl and through a slot in the axial locator receiver;
wherein the axial locator is axially engaged with the axial locator receiver and the axial locator is radially and circumferentially disengaged from the axial locator receiver when the fan cowl is in a closed position.

9. The assembly of claim 1, wherein the fan cowl is configured with circumferential first and second fan cowl sections, and the radial link is disposed at a forward axial edge of the circumferential first fan cowl section.

10. The assembly of claim 1, wherein the inner link end is mounted to the forward portion of the thrust reverser through a first spherical bearing, and the outer link end is mounted to the fan cowl through a second spherical bearing.

11. An assembly for an aircraft propulsion system, comprising:
a nacelle inlet structure;
a thrust reverser including a forward portion and a translating sleeve; and
a fan cowl located axially between the nacelle inlet structure and the translating sleeve, the fan cowl axially covering the forward portion of the thrust reverser, the fan cowl axially structurally tied to the nacelle inlet structure, and the fan cowl radially and circumferentially structurally tied to the forward portion of the thrust reverser;
a radial retainer receiver configured with the forward portion of the thrust reverser; and
a radial retainer comprising an arm and a slider, the arm projecting radially inward from the fan cowl to the slider, and the slider mated and axially slidably within a slot in the radial retainer receiver.

12. The assembly of claim 11, wherein the fan cowl is configured with circumferential first and second fan cowl sections, and the radial retainer is disposed at a circumferential edge of the circumferential first fan cowl section.

13. An assembly for an aircraft propulsion system, comprising:
a nacelle inlet structure;
a thrust reverser including a forward portion and a translating sleeve; and
a fan cowl located axially between the nacelle inlet structure and the translating sleeve, the fan cowl axially covering the forward portion of the thrust reverser, the fan cowl axially structurally tied to the nacelle inlet structure, and the fan cowl radially and circumferentially structurally tied to the forward portion of the thrust reverser; and
a lateral link extending laterally between a first link end and a second link end, the first link end mounted to the forward portion of the thrust reverser, and the second link end mounted to the fan cowl;
wherein the lateral link is configured to transfer substantially only lateral loads between the fan cowl and the forward portion of the thrust reverser.

14. The assembly of claim 13, wherein the fan cowl is configured with circumferential first and second fan cowl sections, and the lateral link is disposed at a circumferential edge of the circumferential first fan cowl section.

15. The assembly of claim 13, wherein the first link end is mounted to the forward portion of the thrust reverser through a first spherical bearing, and the second link end is mounted to the fan cowl through a second spherical bearing.

16. An assembly for an aircraft propulsion system, comprising:
a stationary structure;
a thrust reverser including a forward portion and a translating sleeve, the thrust reverser configured with first and second thrust reverser sections disposed on opposing sides of and pivotally connected to the stationary structure; and
a fan cowl extending axially to the translating sleeve and axially overlapping the forward portion of the thrust reverser, the fan cowl configured with first and second fan cowl sections disposed on opposing sides of the stationary structure, the first fan cowl section pivotally connected to the stationary structure through the first thrust reverser section, and the second fan cowl section pivotally connected to the stationary structure through the second thrust reverser section.

17. The assembly of claim 16, wherein the stationary structure comprises a pylon.

18. The assembly of claim 16, further comprising:
a nacelle inlet structure configured with a nose lip and an outer barrel that extends axially between the nose lip and the fan cowl;
wherein the fan cowl is substantially only axially structurally tied to the nacelle inlet structure, and the fan cowl is substantially only radially and circumferentially structurally tied to the forward portion of the thrust reverser.

19. The assembly of claim 16, wherein the thrust reverser further includes a translating cascade, and at least eighty-five percent of an axial length of the translating cascade is axially overlapped by the fan cowl when the translating cascade is in a stowed position.

\* \* \* \* \*